US008543147B2

(12) United States Patent
Yamazaki

(10) Patent No.: US 8,543,147 B2
(45) Date of Patent: Sep. 24, 2013

(54) RADIO COMMUNICATION SYSTEM, TRANSMISSION SYSTEM, RADIO TERMINAL AND RADIO COMMUNICATION METHOD

(75) Inventor: Chiharu Yamazaki, Yokohama (JP)

(73) Assignee: Kyocera Corporation, Kyoto (JP)

( * ) Notice: Subject to any disclaimer, the term of this patent is extended or adjusted under 35 U.S.C. 154(b) by 118 days.

(21) Appl. No.: 13/120,851

(22) PCT Filed: Sep. 25, 2009

(86) PCT No.: PCT/JP2009/066662
§ 371 (c)(1),
(2), (4) Date: Mar. 24, 2011

(87) PCT Pub. No.: WO2010/035789
PCT Pub. Date: Apr. 1, 2010

(65) Prior Publication Data
US 2011/0223948 A1 Sep. 15, 2011

(30) Foreign Application Priority Data

Sep. 25, 2008 (JP) ................................. 2008-246037

(51) Int. Cl.
*H04B 7/00* (2006.01)
(52) U.S. Cl.
USPC ........ 455/500; 455/450; 455/451; 455/452.1; 455/453; 455/550.1
(58) Field of Classification Search
USPC ............ 455/550.1, 561, 562.1, 500, 450–455
See application file for complete search history.

(56) References Cited

U.S. PATENT DOCUMENTS

| 7,715,877 B2* | 5/2010 | Nakao ......................... 455/562.1 |
| 7,715,880 B2* | 5/2010 | Nakao ......................... 455/562.1 |
| 2006/0121946 A1* | 6/2006 | Walton et al. ................. 455/561 |
| 2008/0260064 A1 | 10/2008 | Shen et al. | |
| 2009/0124210 A1* | 5/2009 | Imai et al. ........................ 455/69 |

FOREIGN PATENT DOCUMENTS

| JP | 2001-257660 A | 9/2001 |
| JP | 2002-033686 A | 1/2002 |
| JP | 2003-023831 A | 1/2003 |
| JP | 2008-523665 A | 7/2008 |
| KR | 10-2008-0065277 A | 7/2008 |
| WO | 03-030534 A2 | 4/2003 |

OTHER PUBLICATIONS

Office Action dated Jul. 26, 2012, issued in counterpart Korean application No. KR10-2011-7008924.
International Search Report and Written Opinion dated Mar. 2, 2010 issued by the Japanese Patent Office for International Application No. PCT/JP2009/066662.
Notification of Reasons for Refusal dated Aug. 21, 2012, issued in counterpart Japanese Application No. 2008-246037.

* cited by examiner

*Primary Examiner* — Fayyaz Alam
(74) *Attorney, Agent, or Firm* — Procopio, Cory, Hargreaves & Savitch LLP

(57) ABSTRACT

A radio communication system (10A) has a transmission system (20A) and a radio terminal (300). The transmission system (20A) superimposes and transmits a delay stream ($S1_{delay}$) and a communication stream (S1), and superimposes and transmits a delay stream ($S2_{delay}$) having a different delay than the delay stream ($S1_{delay}$) and a communication stream (S2). A transmission system (20A) notifies delay information ($S1_{info}$) about the delay stream ($S1_{delay}$) and delay information ($S2_{info}$) about the delay stream ($S2_{delay}$). The radio terminal (300) combines the communication stream (S1) and the delay stream ($S1_{delay}$) in accordance with the notified delay information ($S1_{info}$), and combines the communication stream (S2) and the delay stream ($S2_{delay}$) in accordance with the notified delay information ($S2_{info}$).

15 Claims, 10 Drawing Sheets

FIG. 1
(a)
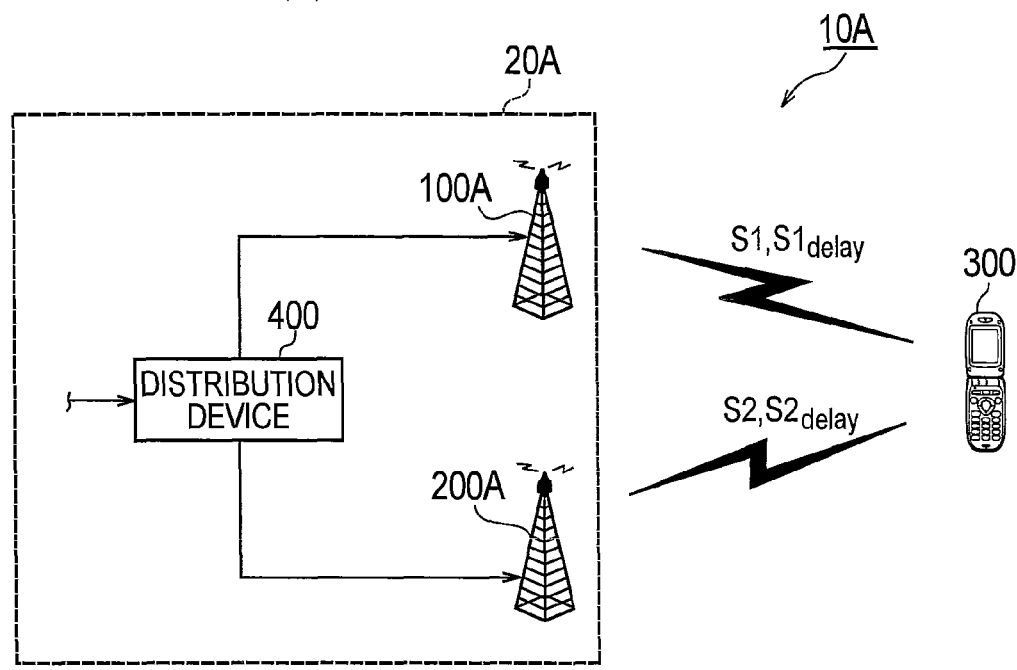
(b)
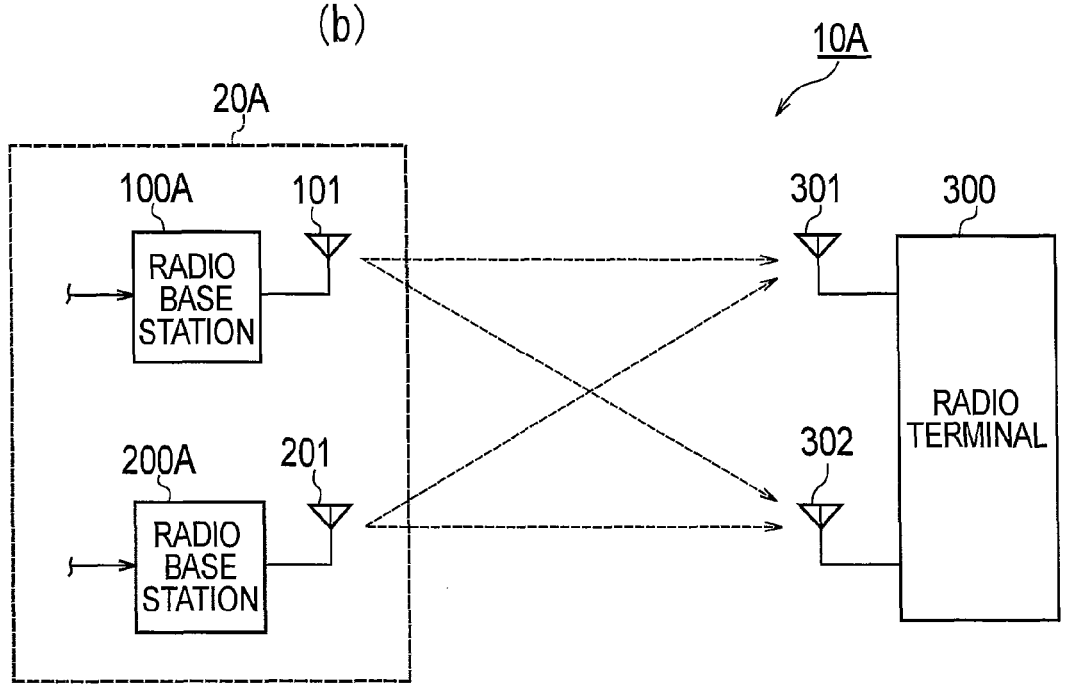

FIG. 2
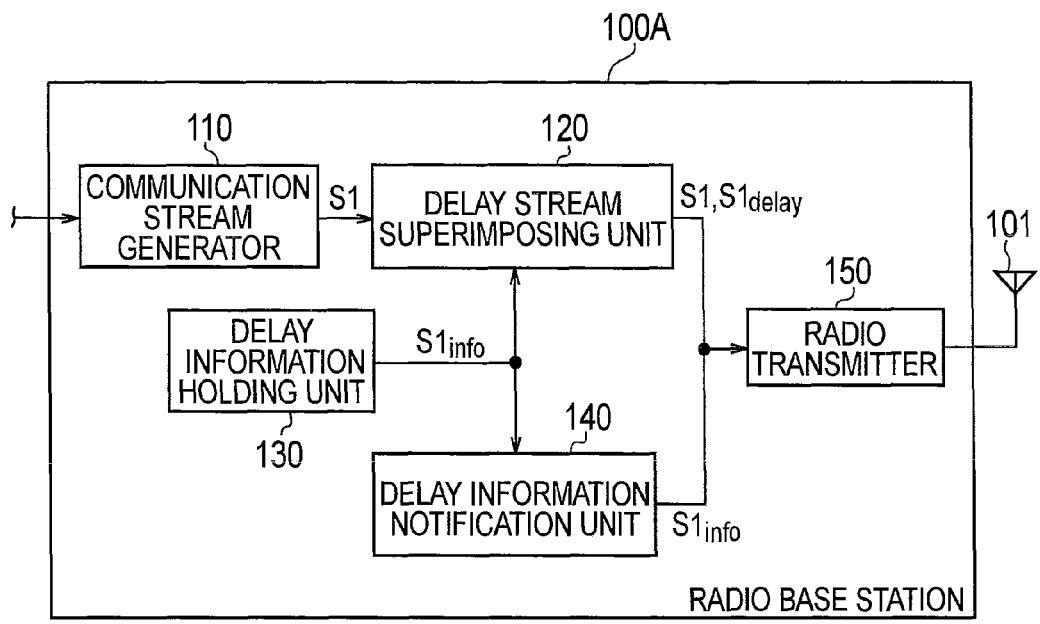
(a)
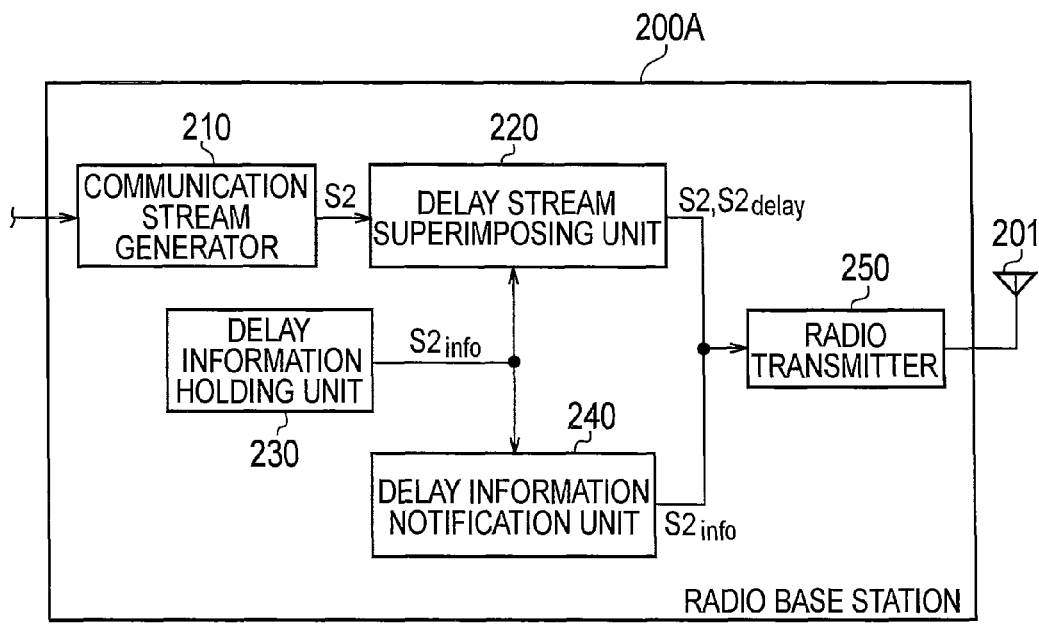
(b)

FIG. 4
(a)
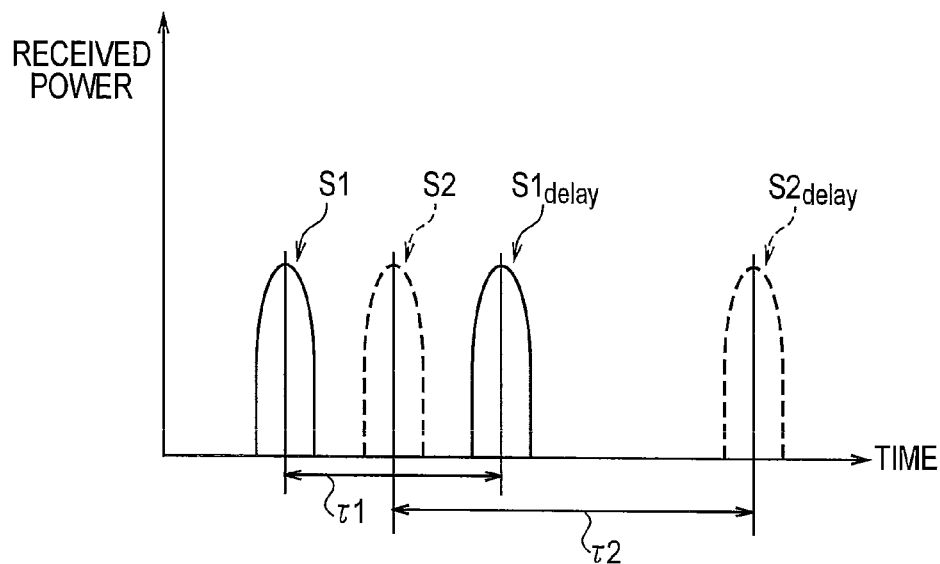
(b)
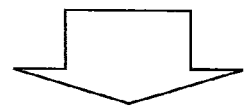
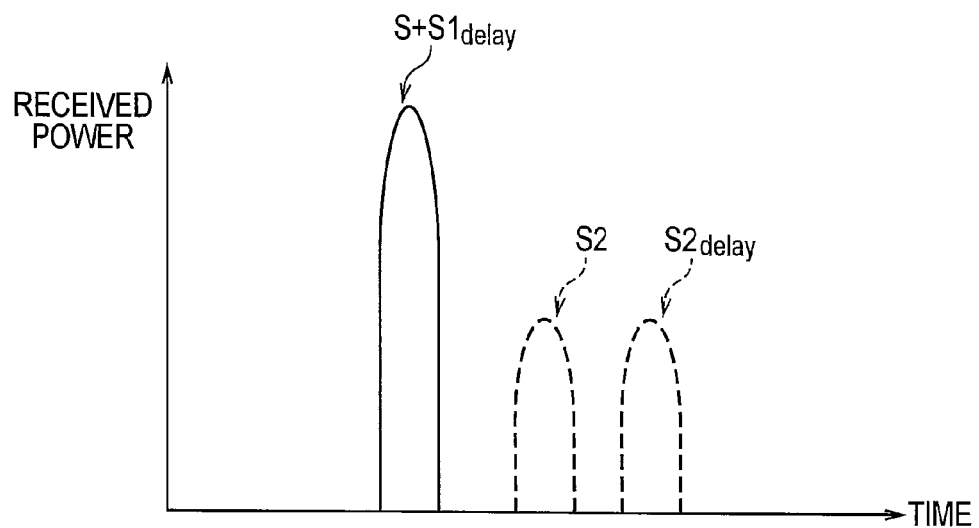

FIG. 5
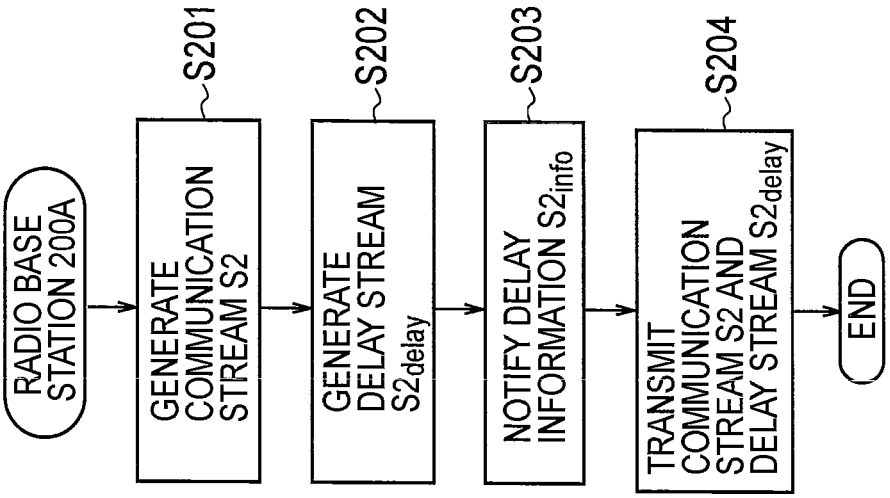
(a)
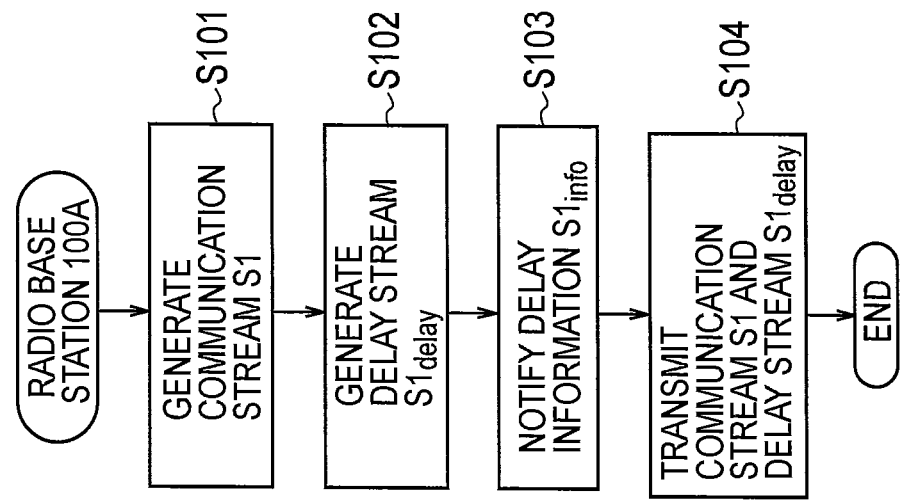
(b)

FIG. 7
(a)
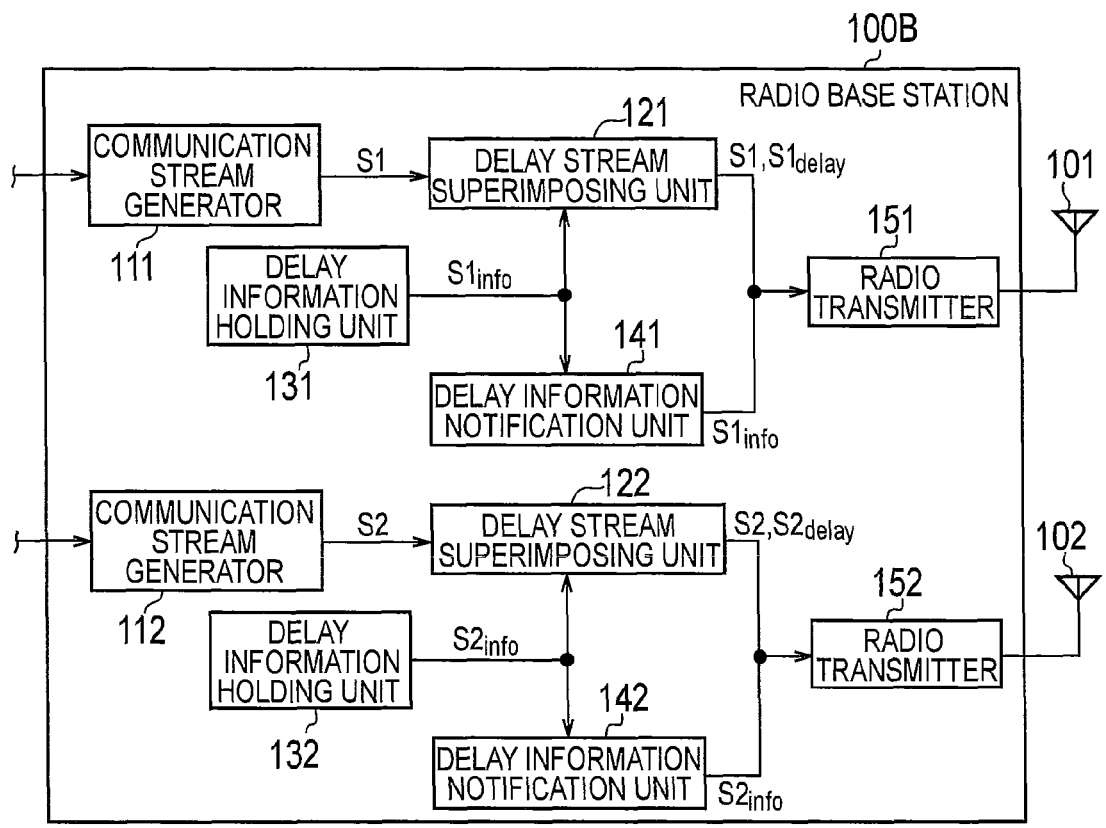
(b)
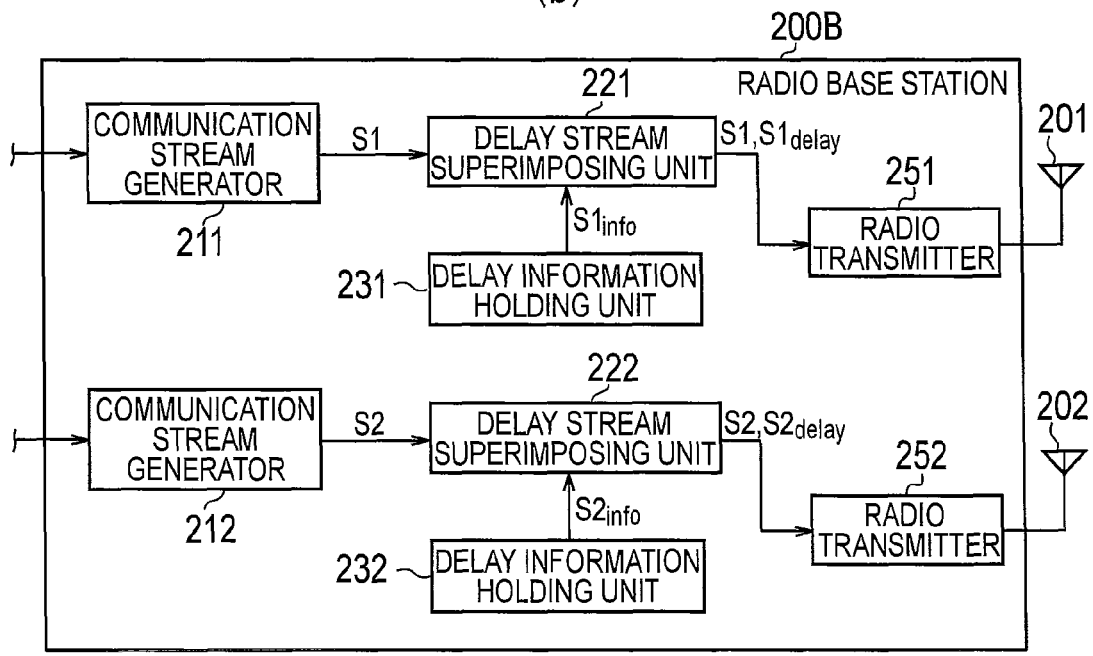

FIG. 8
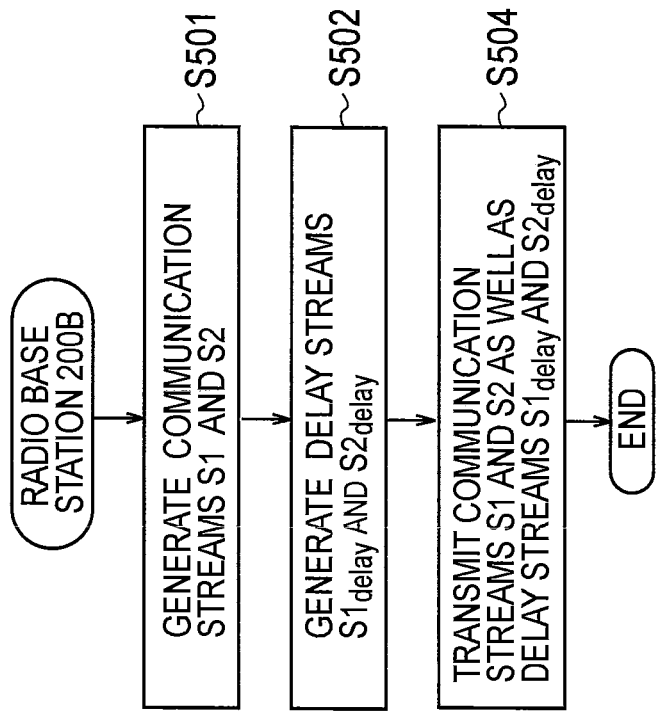
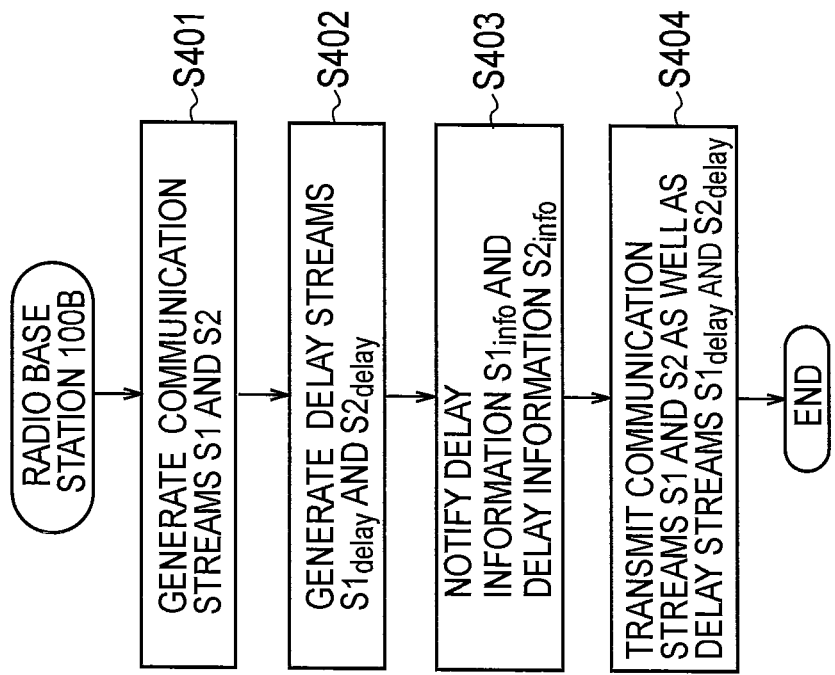

FIG. 9
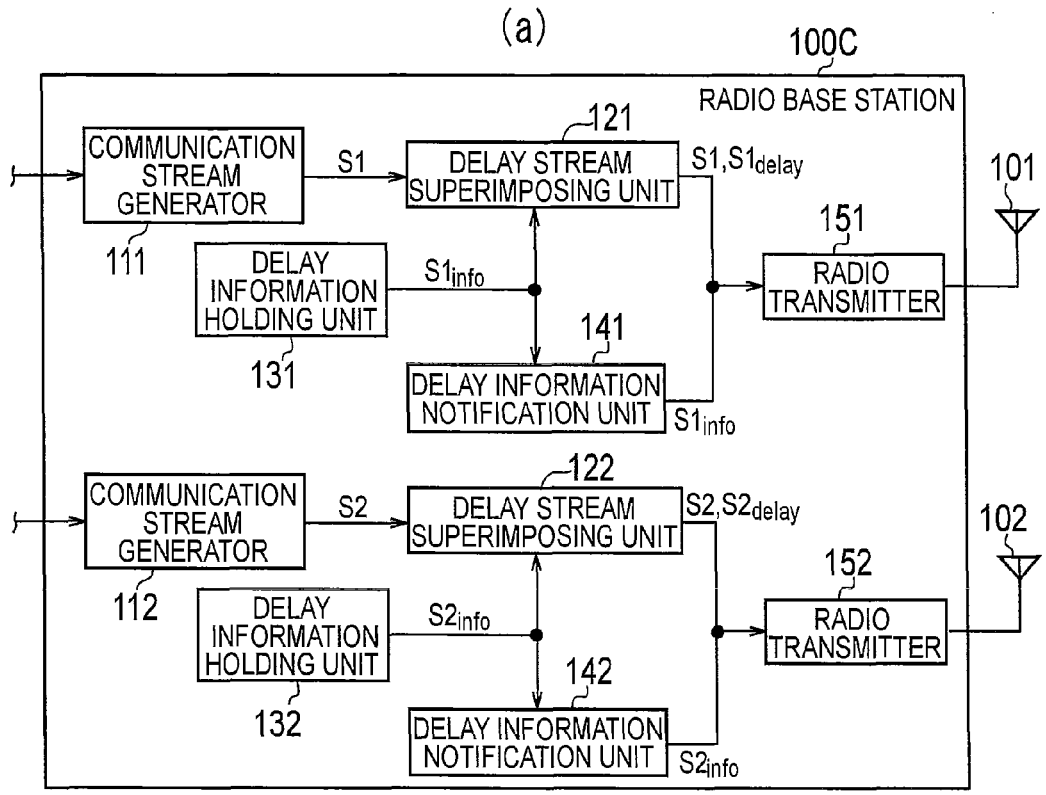
(a)
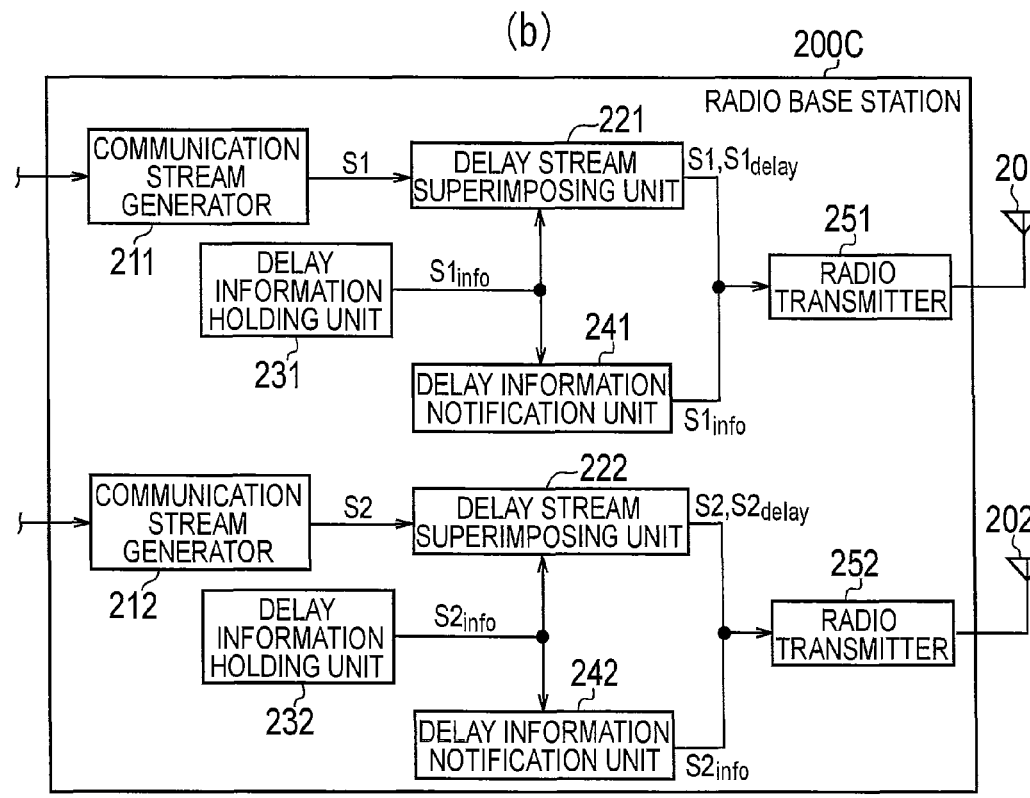
(b)

RADIO COMMUNICATION SYSTEM, TRANSMISSION SYSTEM, RADIO TERMINAL AND RADIO COMMUNICATION METHOD

TECHNICAL FIELD

The present invention relates to a radio communication system, a transmission system, a radio terminal and a radio communication method used for multiple-input multiple-output type communications.

BACKGROUND ART

In recent years, various techniques for efficiently using a limited frequency band have been implemented in a radio communication system. As an example of the techniques, a multiple-input multiple-output (MIMO) technique has been known. With this technique, multiple signal sequences using the same frequency band are simultaneously transmitted via multiple transmission antennas, and the multiple signal sequences are received via multiple reception antennas and then separated from one another.

In a radio communication system using the MIMO technique, the reception side receives the multiple signal sequences in an interference state, and thereafter separates the signal sequences from one another on the basis of differences among propagation channel characteristics of the signal sequences. Specifically, the reception side separates the signal sequences from one another by use of channel estimation values acquired by a channel estimation technique for estimating propagation channel characteristics.

With this MIMO technique, the propagation channel characteristics of the signal sequences can be surely made different from one another by increasing an interval between the installation positions of the antennas, so that the separation performance for the signal sequences (hereinafter, referred to as "signal separation performance") can be improved. For this reason, a cooperative MIMO technique for simultaneously transmitting multiple signal sequences using the same frequency band to a single radio terminal via multiple antennas of multiple radio base stations (radio communication devices) has been proposed (refer to Patent Document 1).

CITATION LIST

Patent Document

Patent Document 1: Japanese Patent Application Publication No. 2008-523665 (such as [Claim 1]).

SUMMARY OF THE INVENTION

The aforementioned cooperative MIMO technique has the following problem, however. Specifically, when a propagation channel characteristic fluctuates rapidly due to movement of the mobile terminal or when a channel estimation value acquired by channel estimation includes an estimation error, the signal separation performance cannot be improved. Accordingly, the aforementioned cooperative MIMO technique has room for improvement in enhancing the signal separation performance.

In this respect, an objective of the present invention is to provide a radio communication system, a transmission system, a radio terminal and a radio communication method each capable of sufficiently improving the signal separation performance by use of a cooperative MIMO technique even in a case where a propagation channel characteristic fluctuates rapidly or where a channel estimation value includes an estimation error.

In order to solve the problems described above, the present invention has the following features. According to a first feature of the present invention, there is provided a radio communication system (e.g. radio communication system 10A) comprising: a transmission system (e.g. transmission system 20A) including a first radio communication device (e.g. radio base station 100A) configured to transmit a first signal sequence (communication stream S1), and a second radio communication device (e.g. radio base station 200A) configured to transmit a second signal sequence (communication stream S2) using the same frequency band as the first signal sequence in the same time range as the first signal sequence; and a radio terminal (radio terminal 300) including a receiver (radio receiver 310) configured to receive the first and second signal sequences from the transmission system in the same time range, and a separation processor (separation processor 330) configured to execute separation processing to separate the first and second signal sequences received by the receiver, wherein the first radio communication device superimposes and transmits the first signal sequence and a first delay signal sequence (delay stream $S1_{delay}$), the first delay signal sequence generated by delaying the first signal sequence, the second radio communication unit superimposes and transmits the second signal sequence and a second delay signal sequence (delay stream $S2_{delay}$), the second delay signal sequence generated by delaying the second signal sequence by a delay amount different from a delay amount of the first delay signal sequence, the transmission system includes a notification unit (e.g. delay information notification unit 140 and delay information notification unit 240) configured to notify the radio terminal of first delay information (delay information $S1_{info}$) about the first delay signal sequence and second delay information (delay information $S2_{info}$) about the second delay signal sequence, and the separation processor combines the first signal sequence and the first delay signal sequence in accordance with the notified first delay information, and also combines the second signal sequence and the second delay signal sequence in accordance with the notified second delay information, when executing the separation processing.

According to the aforementioned radio communication system, the first signal sequence and the first delay signal sequence are combined in accordance with the first delay information, and the second signal sequence and the second delay signal sequence are combined in accordance with the second delay information during the separation processing. Accordingly, the quality of each of the first signal sequence and the second signal sequence can be improved. Thus, the first signal sequence and the second signal sequence can be easily separated. Accordingly, with the radio communication system according to the first feature, even in a case where the propagation channel characteristic fluctuates or where the channel estimation value includes an estimation error, the signal separation performance can be sufficiently improved using a cooperative MIMO technique.

A second feature of the present invention is according to the first feature of the present invention and is summarized in that: when executing diversity transmission using the same signal sequences as the first and second signal sequences, the first radio communication device superimposes and transmits the first signal sequence and the first delay signal sequence, the first delay signal sequence having a delay amount equal to a delay amount of the second delay signal sequence, and when executing the diversity transmission, the second radio communication device superimposes and transmits the second signal sequence and the second delay signal sequence, the second delay signal sequence having a delay amount equal to a delay amount of the first delay signal sequence.

A third feature of the present invention is according to the first feature or the second feature of the present invention and is summarized in that: the separation processor includes: a first extraction unit (first extraction unit 331) configured to extract the first signal sequence in the separation processing; and a second extraction unit (second extraction unit 332) configured to extract the second signal sequence in the separation processing, the first extraction unit extracts the first signal sequence by using at least one of: in-phase combination by which the first signal sequence and the first delay signal sequence are combined in the same phase; and reversed-phase combination by which the second signal sequence and the second delay signal sequence are combined in reversed-phase, and the second extraction unit extracts the second signal sequence by using at least one of: reversed-phase combination by which the first signal sequence and the first delay signal sequence are combined in reversed-phase; and in-phase combination by which the second signal sequence and the second delay signal sequence are combined in the same phase.

A fourth feature of the present invention is according to the first feature or the second feature of the present invention and is summarized in that: the first delay information includes information indicating a delay amount of the first delay signal sequence, and the second delay information includes information indicating a delay amount of the second delay signal sequence.

A fifth feature of the present invention is according to the first feature or the second feature of the present invention and is summarized in that: the first delay signal sequence and the second delay signal sequence have different amplitudes, the first delay information includes information indicating the amplitude of the first delay signal sequence, and the second delay information includes information indicating the amplitude of the second delay signal sequence.

A sixth feature of the present invention is according to the first feature or the second feature of the present invention and is summarized in that: the first radio communication device and the second radio communication device are different radio base stations (e.g. radio base station 100A, radio base station 200A).

According to a seventh feature of the present invention, there is provided a transmission system (e.g. transmission system 20A) comprising: a first radio communication device (e.g. radio base station 100A) configured to transmit a first signal sequence (communication stream S1); a second radio communication device (e.g. radio base station 200A) configured to transmit a second signal sequence (communication stream S2) using the same frequency band as the first signal sequence in the same time range as the first signal sequence; and a notification unit (e.g. delay information notification unit 140 and delay information notification unit 240) configured to notify the radio terminal of first delay information (delay information $S1_{info}$) about a first delay signal sequence and second delay information (delay information $S2_{info}$) about a second delay signal sequence, wherein the first radio communication device superimposes and transmits the first signal sequence and the first delay signal sequence, the first delay signal sequence generated by delaying the first signal sequence, and the second radio communication device superimposes and transmits the second signal sequence and the second delay signal sequence, the second delay signal sequence generated by delaying the second signal sequence by a delay amount different from a delay amount of the first delay signal sequence.

According to an eighth feature of the present invention, there is provided a radio terminal (radio terminal 300) comprising: a receiver (radio receiver 310) configured to receive a first signal sequence (communication stream S1) and a second signal sequence (communication stream S2) in the same time range from a transmission system (e.g. transmission system 20A) including a first radio communication device (e.g. radio base station 100A) transmitting the first signal sequence and a second radio communication device (e.g. radio base station 200A) transmitting the second signal sequence using the same frequency band as the first signal sequence in the same time range as the first signal sequence; and a separation processor (separation processor 330) configured to execute separation processing to separate the first signal sequence and the second signal sequence received by the receiver, wherein the receiver receives the first signal sequence, a first delay signal sequence (delay stream $S1_{delay}$) generated by delaying the first signal sequence, and first delay information (delay information $S1_{info}$) about the first delay signal sequence, the receiver receives the second signal sequence, a second delay signal sequence (delay stream $S2_{delay}$) generated by delaying the second signal sequence by a delay amount different from a delay amount of the first delay signal sequence, and second delay information (delay information $S2_{info}$) about the second delay signal sequence, and the separation processor combines the first signal sequence and the first delay signal sequence in accordance with the first delay information, and also combines the second signal sequence and the second delay signal sequence in accordance with the second delay information, when executing the separation processing.

According to a ninth feature of the present invention, there is provided a radio communication method comprising the steps of: superimposing and transmitting (e.g. step S104), by a first radio communication device configured to transmit a first signal sequence, the first signal sequence and a first delay signal sequence, the first delay signal sequence generated by delaying the first signal sequence; superimposing and transmitting (e.g. step S204), by a second radio communication device configured to transmit a second signal sequence using the same frequency band as the first signal sequence in the same time range as the first signal sequence, the second signal sequence and a second delay signal sequence, the second delay signal generated by delaying the second signal sequence by a delay amount different from that of the first delay signal sequence; notifying (step S103 and S203) a radio terminal of first delay information about the first delay signal sequence and second delay information about the second delay signal sequence by a transmission system including the first radio communication device and the second radio communication device; receiving (step S302) the first signal sequence and the second signal sequence in the same time range by a receiver of the radio terminal from the transmission system; combining (step S303) the first signal sequence and the first delay signal sequence in accordance with the notified first delay information by a separation processor when executing separation processing, the separation processor configured to execute the separation processing to separate the first signal sequence and the second signal sequence received by the receiver; and combining (step S303) the second signal sequence and the second delay signal sequence in accordance with the notified second delay information by the separation processor when executing the separation processing.

According to the present invention, it is possible to provide a radio communication system, a transmission system, a radio terminal and a radio communication method each capable of sufficiently improving the signal separation performance by using a cooperative MIMO technique, even in a case where a propagation channel characteristic fluctuates rapidly or where a channel estimation value includes an estimation error.

BRIEF DESCRIPTION OF DRAWINGS

FIG. 1 is a schematic configuration diagram of a radio communication system according to a first embodiment.

FIG. 2 is a functional block diagram showing a configuration of a radio base station according to the first embodiment.

FIG. 4 is a diagram for describing an example of separation processing executed by the radio terminal according to the first embodiment.

FIG. 5 is a flowchart showing an operation of the radio base station according to the first embodiment.

FIG. 7 is a functional block diagram showing a configuration of a radio base station according to a second embodiment.

FIG. 8 is a flowchart showing an operation of the radio base station according to the second embodiment.

FIG. 9 is a functional block diagram showing a configuration of a radio base station according to other embodiments.

DESCRIPTION OF EMBODIMENTS

Figure 3:
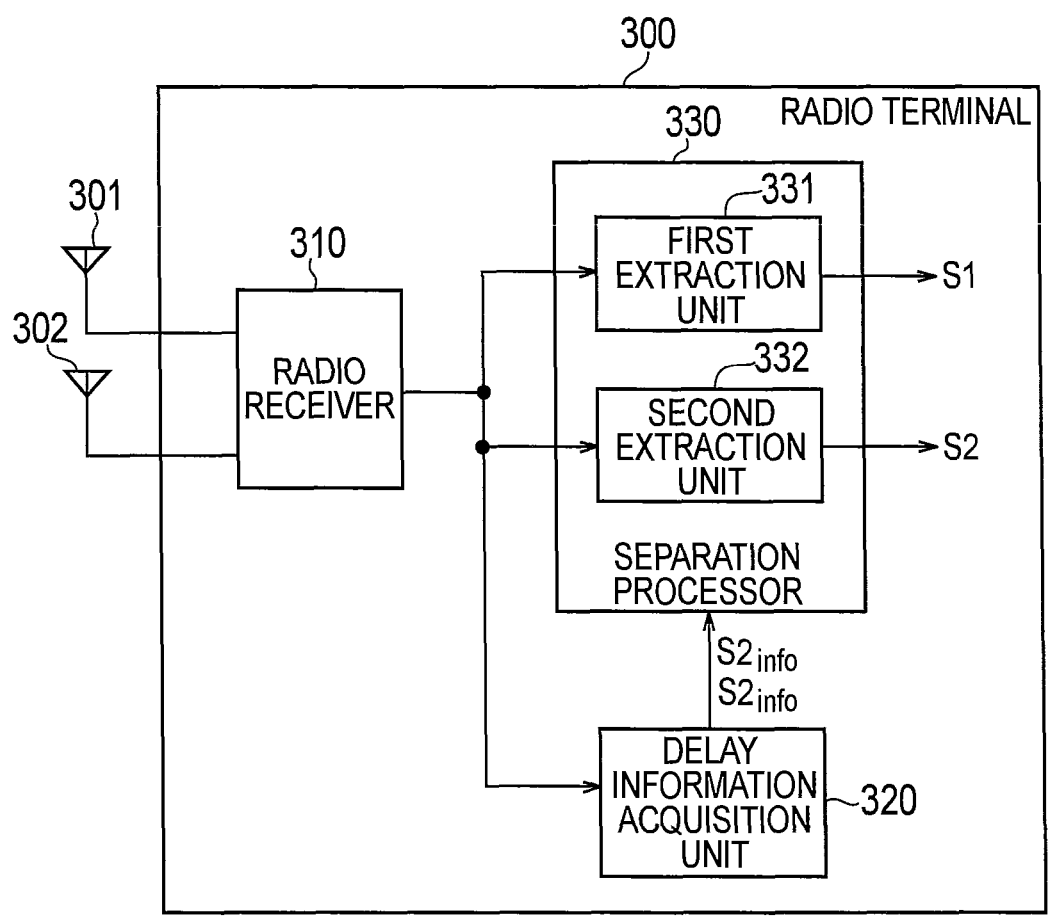
FIG. 3 is a functional block diagram showing a configuration of a radio terminal according to the first embodiment.

Embodiments of the present invention will be described hereinafter with reference to the drawings. In the following description of the drawings in the embodiments, a same or similar reference numeral is given to a same or similar part.

First Embodiment

In a first embodiment of the present invention, descriptions will be given of (1) Schematic Configuration of Radio Communication System, (2) Detailed Configuration of Radio Communication System, (3) Example of Separation Processing, (4) Operation of Radio Communication System, and (5) Advantageous Effects.

(1) Schematic Configuration of Radio Communication System

FIG. 1 is a schematic configuration diagram of a radio communication system 10A according to the first embodiment. A cooperative MIMO technique is applied to the radio communication system 10A.

As shown in FIG. 1(a), the radio communication system 10A includes a transmission system 20A and a radio terminal 300. The transmission system 20A has a radio base station 100A, a radio base station 200A and a distribution device 400.

The distribution device 400 distributes an information data sequence to be transmitted to the radio terminal 300 between the radio base stations 100A and 200A. For example, the distribution device 400 converts the information data sequence into two information data sequences by serial/parallel conversion. Among the two information data sequences obtained by the conversion, one of the information data sequences is inputted to the radio base station 100A while the other one of the information data sequences is inputted to the radio base station 200A.

The radio base station 100A generates a communication stream S1 (first signal sequence) from the information data sequence received from the distribution device 400 and then transmits the generated communication stream S1 to the radio terminal 300. The radio base station 100A forms a first radio communication device configured to transmit the communication stream S1 to the radio terminal 300 in the first embodiment.

The radio base station 200A generates a communication stream S2 (second signal sequence) from the information data sequence received from the distribution device 400 and then transmits the generated communication stream S2 to the radio terminal 300. The communication streams S1 and S2 are different signal sequences. The radio base station 200A forms a second radio communication device configured to transmit the communication stream S2 to the radio terminal 300 in the first embodiment.

The radio base stations 100A and 200A respectively transmit the communication streams S1 and S2 by using the same radio resource. Specifically, the radio base station 100A transmits the communication stream S1 using the same frequency band as the communication stream S2 to the radio terminal 300 in the same time range (time slot) as that of the communication stream S2. Likewise, the radio base station 200A transmits the communication stream S2 using the same frequency band as the communication stream S1 to the radio terminal 300 in the same time range (time slot) as that of the communication stream S1.

The radio base station 100A superimposes and transmits the communication stream S1 and a delay stream $S1_{delay}$ (first delay signal sequence), the delay stream $S1_{delay}$ generated by delaying the communication stream S1. The radio base station 200A superimposes and transmits the communication stream S2 and a delay stream $S2_{delay}$ (second delay signal sequence), the delay stream $S2_{delay}$ generated by delaying the communication stream S2. The delay streams $S1_{delay}$ and $S2_{delay}$ have different delay amounts.

The radio base stations 100A and 200A notify the radio terminal 300 of delay information $S1_{info}$ (first delay information) about the delay stream $S1_{delay}$ and delay information $S2_{info}$ (second delay information) about the delay stream $S2_{delay}$ (refer to FIG. 2).

After receiving the communication streams S1 and S2 in an interference state, the radio terminal 300 separates the communication streams S1 and S2 on the basis of a difference between the propagation channel characteristics of the respective communication streams S1 and S2, for example. The radio terminal 300 separates the communication streams S1 and S2 by use of channel estimation values acquired by a channel estimation technique for estimating propagation channel characteristics.

In a case where the propagation channel characteristic fluctuates rapidly due to movement of the radio terminal 300 or the like, or a case where the channel estimation value acquired by the channel estimation includes an estimation error, the signal separation performance cannot be improved. In this respect, before executing separation processing, the radio terminal 300 combines the communication stream S1 and the delay stream $S1_{delay}$ in accordance with the delay information $S1_{info}$ notified by the transmission system 20A and also combines the communication stream S2 and the delay stream $S2_{delay}$ in accordance with the delay information $S2_{info}$ notified by the transmission system 20A. Thus, the signal separation performance can be improved.

In the first embodiment, the radio base station 100A of the transmission system 20A has an antenna 101 and the radio base station 200A has an antenna 102 as shown in FIG. 1(b). The radio terminal 300 has two antennas 301 and 302. Specifically, MIMO communications using two-by-two antenna configuration are performed in the radio communication system 10A according to the first embodiment.

(2) Detailed Configuration of Radio Communication System

Next, a detailed configuration of the radio communication system 10A will be described with reference to FIGS. 2 and 3. Specifically, (2.1) Configuration of Radio Base Station and (2.2) Configuration of Radio Terminal will be described. Here, a description will be given of only a configuration related to the present invention.

(2.1) Configuration of Radio Base Station

FIG. 2(a) is a functional block diagram showing a configuration of the radio base station 100A.

As shown in FIG. 2(a), the radio base station 100A includes a communication stream generator 110, a delay stream superimposing unit 120, a delay information holding unit 130, a delay information notification unit 140 and a radio transmitter 150. The antenna 101 is connected to the radio transmitter 150.

The communication stream generator 110 generates the communication stream S1 from the information data sequence received from the distribution device 400.

The delay information holding unit 130 previously holds the delay information $S1_{info}$ about the delay stream $S1_{delay}$. The delay information $S1_{info}$ includes parameter information of the delay stream $S1_{delay}$. Specifically, the delay information $S1_{info}$ includes information indicating a delay amount (at least one of delay time and a phase delay amount) of the delay stream $S1_{delay}$. Here, the information indicating the delay amount may be a value of the delay amount itself or an index associated with the delay amount. The delay information $S1_{info}$ may include information showing amplitude of the delay stream $S1_{delay}$.

The delay stream superimposing unit 120 generates the delay stream $S1_{delay}$ by delaying the communication stream S1 on the basis of the delay information $S1_{info}$ held by the delay information holding unit 130, and then superimposes the generated delay stream $S1_{delay}$ on the communication stream S1. In a case where the delay information $S1_{info}$ includes information indicating amplitude of the delay stream $S1_{delay}$, the delay stream superimposing unit 120 adjusts the amplitude of the delay stream $S1_{delay}$ in accordance with the information.

The radio transmitter 150 includes an up-converter and a power amplifier or the like. The radio transmitter 150 transmits to the radio terminal 300 the communication stream S1 on which the delay stream $S1_{delay}$ is superimposed by the delay stream superimposing unit 120.

The delay information notification unit 140 notifies, via the radio transmitter 150, the radio terminal 300 of the delay information $S1_{info}$ held by the delay information holding unit 130. For example, the delay information notification unit 140 notifies the radio terminal 300 of the delay information $S1_{info}$ during negotiation executed when communications with the radio terminal 300 are started. Alternatively, the delay information notification unit 140 notifies the radio terminal 300 of the delay information $S1_{info}$ by periodically broadcasting the delay information $S1_{info}$.

FIG. 2(b) is a functional block diagram showing a configuration of the radio base station 200A.

As shown in FIG. 2(b), the radio base station 200A includes a communication stream generator 210, a delay stream superimposing unit 220, a delay information holding unit 230, a delay information notification unit 240 and a radio transmitter 250. The antenna 201 is connected to the radio transmitter 250.

The communication stream generator 210 generates the communication stream S2 from the information data sequence received from the distribution device 400.

The delay information holding unit 230 previously holds the delay information $S2_{info}$ about the delay stream $S2_{delay}$. The delay information $S2_{info}$ includes parameter information of the delay stream $S2_{delay}$. Specifically, the delay information $S2_{info}$ includes information indicating a delay amount (at least one of delay time and a phase delay amount) of the delay stream $S2_{delay}$. The delay information $S2_{info}$ may include information indicating amplitude of the delay stream $S2_{delay}$. Here, the content of the delay information $S2_{info}$ held by the delay information holding unit 230 and the content of the delay information $S1_{info}$ held by the delay information holding unit 130 are different.

The delay stream superimposing unit 220 generates the delay stream $S2_{delay}$ by delaying the communication stream S2 on the basis of the delay information $S2_{info}$ held by the delay information holding unit 230, and then superimposes the generated delay stream $S2_{delay}$ on the communication stream S2.

Since the content of the delay information $S1_{info}$ and the content of the delay information $S2_{info}$ are different, the delay amount of the delay stream $S2_{delay}$ is different from the delay amount of the delay stream $S1_{delay}$. For example, a delay amount τ2 of the delay stream $S2_{delay}$ is larger than a delay amount τ1 of the delay stream $S1_{delay}$ (refer to FIG. 4).

The radio transmitter 250 includes an up-converter and a power amplifier or the like. The radio transmitter 250 transmits to the radio terminal 300 the communication stream S2 on which the delay stream $S2_{delay}$ is superimposed by the delay stream superimposing unit 220.

The delay information notification unit 240 notifies, via the radio transmitter 250, the radio terminal 300 of the delay information $S2_{info}$ held by the delay information holding unit 230. The notification method for the delay information $S2_{info}$ is the same as the notification method for the delay information $S1_{info}$. The delay information notification unit 140 and the delay information notification unit 240 in the first embodiment form a notification unit configured to notify the radio terminal 300 of the delay information $S1_{info}$ and the delay information $S2_{info}$.

(2.2) Configuration of Radio Terminal

FIG. 3 is a functional block diagram showing a configuration of the radio terminal 300.

As shown in FIG. 3, the radio terminal 300 includes a radio receiver 310, a delay information acquisition unit 320 and a separation processor 330. The antennas 301 and 302 are connected to the radio receiver 310.

The radio receiver 310 includes low noise amplifiers and down-converters respectively corresponding to the antennas 301 and 302. The radio receiver 310 receives, in an interference state, the communication stream S1 on which the delay stream $S1_{delay}$ is superimposed and the communication stream S2 on which the delay stream $S2_{delay}$ is superimposed. The communication streams S1 and S2 received in the interference state are inputted to the separation processor 330.

The radio receiver 300 receives the delay information $S1_{info}$ notified by the radio base station 100A and the delay information $S2_{info}$ notified by the radio base station 200A. The delay information acquisition unit 320 acquires the delay information $S1_{info}$ and the delay information $S2_{info}$ from the radio receiver 310. The delay information acquisition unit 320 transmits the delay information $S1_{info}$ and the delay information $S2_{info}$ to the separation processor 330.

The separation processor 330 executes separation processing to separate the communication streams S1 and S2 on the basis of a difference between the propagation channel characteristics, the communication streams S1 and S2 received in the interference state. As an example of the separation processing, an existing signal separation technique such as MLD (Maximum Likelihood Detection) or MMSE (Minimum Mean Square Error) can be used.

Before executing the separation processing, the separation processor 330 combines the communication stream S1 and the delay stream $S1_{delay}$ in accordance with the delay information $S1_{info}$ and also combines the communication stream S2 and the delay stream $S2_{delay}$ in accordance with the delay information $S2_{info}$.

The separation processor 330 has a first extraction unit 331 configured to extract the communication stream S1 and a second extraction unit 332 configured to extract the communication stream S2.

The first extraction unit 331 extracts the communication stream S1 by using at least one of in-phase combination by which the communication stream S1 and the delay stream $S1_{delay}$ are combined in the same phase, and reversed-phase combination by which the communication stream S2 and the delay stream $S2_{delay}$ are combined in reversed-phase.

The first extraction unit 331 causes the communication stream S1 and the delay stream $S1_{delay}$ to coincide with each other on the time axis in accordance with the delay information $S1_{info}$, and thereafter, combines the communication stream S1 and the delay stream $S1_{delay}$ in the same phase. The first extraction unit 331 causes the communication stream S2 and the delay stream $S2_{delay}$ to coincide with each other on the time axis in accordance with the delay information $S2_{info}$, and thereafter, combines the communication stream S2 and the delay streams $S2_{delay}$ in reversed-phase.

The second extraction unit 332 extracts the communication stream S2 by use of at least one of reversed-phase combination by which the communication stream S1 and the delay stream $S1_{delay}$ are combined in reversed-phase, and in-phase combination by which the communication stream S2 and the delay stream $S2_{delay}$ are combined in the same phase.

The second extraction unit 332 causes the communication stream S1 and the delay stream $S1_{delay}$ to coincide with each other on the time axis in accordance with the delay information $S1_{info}$, and thereafter, combines the communication stream S1 and the delay stream $S1_{delay}$ in reversed-phase. The second extraction unit 332 causes the communication stream S2 and the delay stream $S2_{delay}$ to coincide with each other on the time axis in accordance with the delay information $S2_{info}$, and thereafter, combines the communication stream S2 and the delay streams $S1_{delay}$ in the same phase.

(3) Example of Separation Processing

Next, an example of the separation processing executed by the separation processor 330 will be described with reference to FIG. 4. Here, a description will be given of a case where the first extraction unit 331 combines the communication stream S1 and the delay stream $S1_{delay}$ in the same phase.

As shown in FIG. 4(a), the radio base station 100A transmits the delay stream $S1_{delay}$ together with the communication stream S1, the delay stream $S1_{delay}$ obtained by delaying the communication stream S1 only by the delay amount τ1. Meanwhile, the radio base station 200A transmits the delay stream $S2_{delay}$ together with the communication stream S2, the delay stream $S2_{delay}$ obtained by delaying the communication stream S2 only by the delay amount τ2.

Since the communication stream S1, the delay stream $S1_{delay}$, the communication stream S2 and the delay stream $S2_{delay}$ are transmitted by using the same radio resource, the signal received by the radio receiver 310 of the radio terminal 300 includes a mixture of the communication stream S1, the delay stream $S1_{delay}$, the communication stream S2 and the delay stream $S2_{delay}$.

The first extraction unit 331 specifies the delay amount τ1 from the delay information $S1_{info}$ acquired by the delay information acquisition unit 320 and then detects the communication stream S1 and the delay stream $S1_{delay}$ in accordance with the delay amount τ1. Here, since the delay amounts τ1 and τ2 are different from each other, the first extraction unit 331 can distinguish the communication stream S1 and the delay stream $S1_{delay}$ from the communication stream S2 and the delay stream $S1_{delay}$.

The first extraction unit 331 causes the communication stream S1 and the delay stream $S1_{delay}$ to coincide with each other on the time axis in accordance with the delay amount τ1. At this time, since the delay amounts τ1 and τ2 are different from each other, the communication stream S2 and the delay stream $S1_{delay}$ do not coincide with each other. Then, the first extraction unit 331 combines the communication stream S1 and the delay stream $S1_{delay}$ in the same phase. Accordingly, the quality of the communication stream S1 is improved as shown in FIG. 4(b).

(4) Operation of Radio Communication System

Next, an operation of the radio communication system 10A will be described with reference to FIGS. 5 and 6. Specifically, (4.1) Operation of Radio Base Station and (4.2) Operation of Radio Terminal will be described.

(4.1) Operation of Radio Base Station

FIG. 5(a) is a flowchart showing an operation of the radio base station 100A.

In step S101, the communication stream generator 110 generates the communication stream S1.

In step S102, the delay stream superimposing unit 120 generates the delay stream $S1_{delay}$ on the basis of the delay information $S1_{info}$ held by the delay information holding unit 130, and then superimposes the generated delay stream $S1_{delay}$ on the communication stream S1.

In step S103, the delay information notification unit 140 notifies the radio terminal 300 of the delay information $S1_{info}$ held by the delay information holding unit 130. Note that, the processing in step S103 may be executed before step S101 or between steps S101 and S102.

In step S104, the radio transmitter 150 transmits to the radio terminal 300 the communication stream S1 on which the delay stream $S1_{delay}$ is superimposed by the delay stream superimposing unit 120.

FIG. 5(b) is a flowchart showing an operation of the radio base station 200A.

In step S201, the communication stream generator 210 generates the communication stream S2.

In step S202, the delay stream superimposing unit 220 generates the delay stream $S2_{delay}$ on the basis of the delay information $S2_{info}$ held by the delay information holding unit 230, and then superimposes the generated delay stream $S2_{delay}$ on the communication stream S2.

In step S203, the delay information notification unit 240 notifies the radio terminal 300 of the delay information $S2_{info}$ held by the delay information holding unit 230.

In step S204, the radio transmitter 250 transmits to the radio terminal 300 the communication stream S2 on which the delay stream $S2_{delay}$ is superimposed by the delay stream superimposing unit 220. The processing in step 204 is executed simultaneously with the processing in step S104.

(4.2) Operation of Radio Terminal

Figure 6:
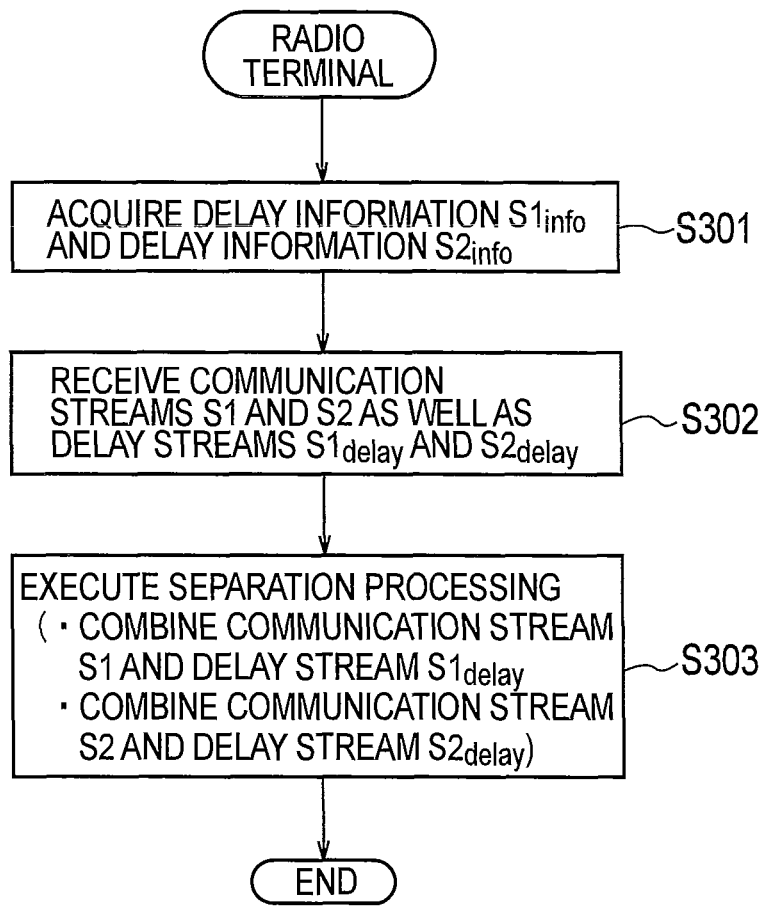
FIG. 6 is a flowchart showing an operation of the radio terminal according to the first embodiment.

FIG. 6 is a flowchart showing an operation of the radio terminal 300.

In step S301, the delay information acquisition unit 320 acquires the delay information $S1_{info}$ and the delay information $S2_{info}$.

In step S302, the radio receiver 310 receives, in an interference state, the communication stream S1 on which the delay stream $S1_{delay}$ is superimposed and the communication stream S2 on which the delay stream $S2_{delay}$ is superimposed.

In step S303, the separation processor 330 executes the separation processing. Specifically, the separation processor 330 combines the communication stream S1 and the delay stream $S1_{delay}$ in accordance with the delay information $S1_{info}$ and also combines the communication stream S2 and the delay stream $S2_{delay}$ in accordance with the delay information $S2_{info}$.

(5) Advantageous Effects

As described above, in the radio communication system 10A, the communication stream S1 and the delay stream $S1_{delay}$ are combined in accordance with the delay information $S1_{info}$, and the communication stream S2 and the delay stream $S2_{delay}$ are combined in accordance with the delay information $S2_{info}$. Thus, the quality of each of the communication streams S1 and S2 can be enhanced, and thus, the communication streams S1 and S2 can be easily separated.

Accordingly, with the radio communication system 10A, the signal separation performance can be improved using a cooperative MIMO technique, even in a case where the propagation channel characteristic fluctuates rapidly or the channel estimation value includes an estimation error.

Further, the signal separation performance can be sufficiently improved even in a case where the reception quality (such as a received signal strength indicator (RSSI) or a received signal-to-noise ratio (SNR)) decreases in the radio terminal 300.

In addition, since the first extraction unit 331 combines the communication stream S1 and the delay stream $S1_{delay}$ in the same phase, the quality of the communication stream S1 is improved, and thus, the communication stream S1 can be extracted easily.

Since the first extraction unit 331 combines the communication stream S2 and the delay stream $S2_{delay}$ in reversed-phase, the communication stream S2 and the delay stream $S2_{delay}$ cancel out with each other. Thus, the communication stream S1 can be extracted easily.

In addition, since the second extraction unit 332 combines the communication stream S2 and the delay stream $S2_{delay}$ in the same phase, the quality of the communication stream S2 is improved, and thus, the communication stream S2 can be extracted easily.

Since the second extraction unit 332 combines the communication stream S1 and the delay stream $S1_{delay}$ in reversed-phase, the communication stream S1 and the delay stream $S1_{delay}$ cancel out with each other. Thus, the communication stream S2 can be extracted easily.

Second Embodiment

Next, a second embodiment of the present invention will be described. The second embodiment is an embodiment in which diversity transmission is also used in addition to the configuration and operation of the first embodiment.

The configuration and operation of the radio terminal 300 is the same as those of the first embodiment. For this reason, in the second embodiment, descriptions will be given of (1) Configuration of Radio Base Station, (2) Operation of Radio Base Station, and (3) Advantageous Effects.

(1) Configuration of Radio Base Station

FIG. 7 is a functional block diagram showing a configuration of a radio base station 100B (first radio communication device) and a radio base station 200B (second radio communication device) according to the second embodiment.

The radio base station 100B has two antennas 101 and 102, and the radio base station 200B has two antennas 201 and 202. Specifically, MIMO communications using four-by-two antenna configuration are performed in the radio communication system according to the second embodiment.

As shown in FIG. 7(a), the radio base station 100B has communication stream generators 111 and 112, delay stream superimposing units 121 and 122, delay information holding units 131 and 132, delay information notification units 141 and 142 and radio transmitters 151 and 152. The antenna 101 is connected to the radio transmitter 151. The antenna 102 is connected to the radio transmitter 152.

As shown in FIG. 7(b), the radio base station 200B has communication stream generators 211 and 212, delay stream superimposing units 221 and 222, delay information holding units 231 and 232, delay information notification units 241 and 242 and radio transmitters 251 and 252. The antenna 201 is connected to the radio transmitter 251. The antenna 202 is connected to the radio transmitter 252.

The delay information holding unit 131 of the radio base station 100B and the delay information holding unit 231 of the radio base station 200B hold the same delay information $S1_{info}$. The delay information holding unit 132 of the radio base station 100B and the delay information holding unit 232 of the radio base station 200B hold the same delay information $S2_{info}$. The radio transmitters 151 and 152, and 251 and 252 execute transmission using the same radio resource (frequency band and time slot).

(2) Operation of Radio Base Station

Next, an operation of the radio base station 100B and the radio base station 200B will be described with reference to FIG. 8. FIG. 8(a) is a flowchart showing an operation of the radio base station 100B.

In step S401, the communication stream generator 111 generates the communication stream S1. The communication stream generator 112 generates the communication stream S2. The communication streams S1 and S2 are different signal sequences.

In step S402, the delay stream superimposing unit 121 generates the delay stream $S1_{delay}$ on the basis of the delay information $S1_{info}$ held by the delay information holding unit 131, and then superimposes the generated delay stream $S1_{delay}$ on the communication stream S1. The delay stream superimposing unit 122 generates the delay stream $S2_{delay}$ on the basis of the delay information $S2_{info}$ held by the delay information holding unit 132, and then superimposes the generated delay stream $S2_{delay}$ on the communication stream S2.

In step S403, the delay information notification unit 141 notifies the radio terminal 300 of the delay information $S1_{info}$ held by the delay information holding unit 131. The delay information notification unit 142 notifies the radio terminal 300 of the delay information $S2_{info}$ held by the delay information holding unit 132. The delay information notification units 141 and 142 form a notification unit configured to notify the radio terminal 300 of the delay information $S1_{info}$ and the delay information $S2_{info}$ in the second embodiment. Note that, the processing in step S403 may be executed before step S401 or between steps S401 and S402.

In step S404, the radio transmitter 151 transmits to the radio terminal 300 the communication stream S1 on which the delay stream $S1_{delay}$ is superimposed by the delay stream superimposing unit 121. The radio transmitter 152 transmits to the radio terminal 300 the communication stream S2 on which the delay stream $S2_{delay}$ is superimposed by the delay stream superimposing unit 122.

FIG. 8(b) is a flowchart showing an operation of the radio base station 200B.

In step S501, the communication stream generator 211 generates the communication stream S1. The communication stream generator 212 generates the communication stream S2.

In step S502, the delay stream superimposing unit 221 generates the delay stream $S1_{delay}$ on the basis of the delay information $S1_{info}$ held by the delay information holding unit 231, and then superimposes the generated delay stream $S1_{delay}$ on the communication stream S1. In addition, the delay stream superimposing unit 222 generates the delay stream $S2_{delay}$ on the basis of the delay information $S2_{info}$ held by the delay information holding unit 232, and then superimposes the generated delay stream $S2_{delay}$ on the communication stream S2.

In step S504, the radio transmitter 251 transmits to the radio terminal 300 the communication stream S1 on which the delay stream $S1_{delay}$ is superimposed by the delay stream superimposing unit 221. The radio transmitter 252 transmits to the radio terminal 300 the communication stream S2 on which the delay stream $S2_{delay}$ is superimposed by the delay stream superimposing unit 222. Note that, the processing in step 504 is executed simultaneously with the processing in step S404.

(3) Advantageous Effects

In the second embodiment, the radio transmitter 151 of the radio base station 100B and the radio transmitter 251 of the radio base station 200B perform diversity transmission of the same communication stream S1, and transmit the delay stream $S1_{delay}$ after superimposing the delay stream $S1_{delay}$ on the communication stream S1, the delay stream $S1_{delay}$ generated on the basis of the same delay information $S1_{info}$.

In addition, the radio transmitter 152 of the radio base station 100B and the radio transmitter 252 of the radio base station 200B perform diversity transmission of the same communication stream S2, and transmits the delay streams $S2_{delay}$ after superimposing the delay stream $S2_{delay}$ on the communication stream S2, the delay stream $S2_{delay}$ generated on the basis of the same delay information $S2_{info}$.

Thus, according to the second embodiment, each of the communication streams S1 and S2 is doubled, so that diversity effect can be obtained. Accordingly, the communications of a quality higher than that of the communications in the first embodiment can be achieved.

Other Embodiments

As described above, the details of the present invention have been disclosed by using the embodiments of the present invention. However, it should not be understood that the description and drawings which constitute part of this disclosure limit the present invention. From this disclosure, various alternative embodiments, examples, and operation techniques will be easily found by those skilled in the art.

For example, only the radio base station 100B notifies the radio terminal 300 of the delay information $S1_{info}$ and the delay information $S2_{info}$ in the second embodiment. However, as shown in FIG. 9, the radio base station 200B may notify the radio terminal 300 of the delay information $S1_{info}$ and the delay information $S2_{info}$.

A radio base station 100C shown in FIG. 9(a) is configured in the same manner as the radio base station 100B according to the second embodiment. A radio base station 200C shown in FIG. 9(b) is different from the radio base station 200B according to the second embodiment and has delay information notification units 241 and 242. The delay information notification unit 241 notifies the radio terminal 300 of the delay information $S1_{info}$. The delay information notification unit 242 notifies the radio terminal 300 of the delay information $S2_{info}$.

In the aforementioned first embodiment, the transmission system 20A has the radio base station 100A configured to transmit the delay streams $S1_{delay}$ after superimposing the delay streams $S1_{delay}$ on the delay stream S1, and the radio base station 200A configured to transmit the delay streams $S2_{delay}$ after superimposing the delay streams $S1_{delay}$ on the delay stream S2.

Figure 10:
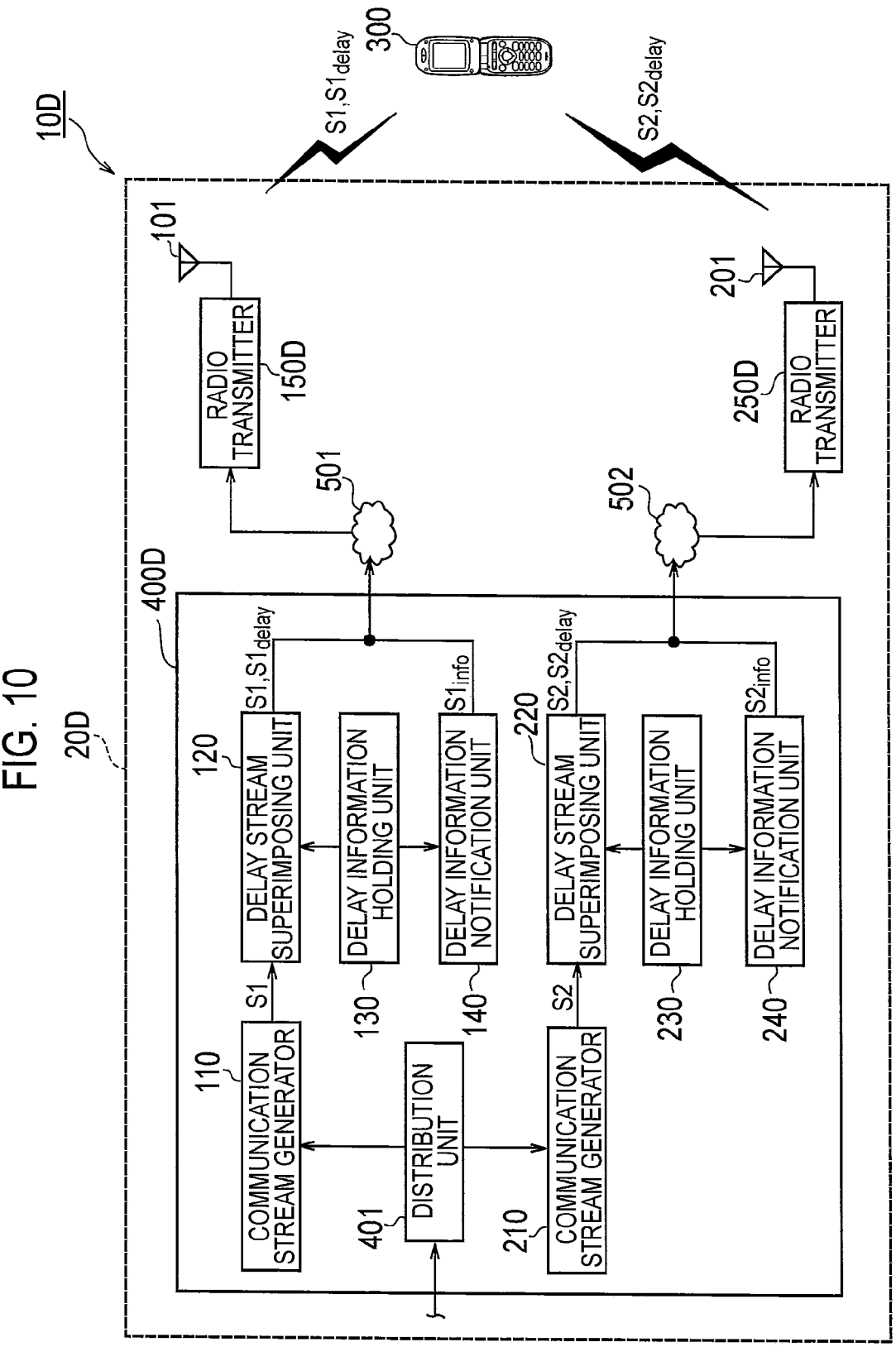
FIG. 10 is a schematic configuration diagram of a radio communication system according to the other embodiments.

However, a radio communication system 10D configured to include a transmission system 20D as shown in FIG. 10 may be employed. The transmission system 20D has a distribution device 400D and radio transmitters 150D and 250D. The radio transmitters 150D and 250D are installed with an interval equal to an interval between the installation positions of the radio base stations, for example. The distribution device 400D and the radio transmitter 150D are connected to each other via a relay network 501. The distribution device 400D and the radio transmitter 250D are connected to each other via a relay network 502.

The distribution device 400D is provided with the communication stream generator 110, the delay stream superimposing unit 120, the delay information holding unit 130 and the delay information notification unit 140 shown in FIG. 2(a). In addition, the distribution device 400D is provided with the communication stream generator 210, the delay stream superimposing unit 220, the delay information holding unit 230 and the delay information notification unit 240 shown in FIG. 2(b).

The radio transmitter 150D forms a first radio communication device configured to transmit the delay stream $S1_{delay}$ after superimposing the delay stream $S1_{delay}$ on the delay stream S1. The radio transmitter 250D forms a second radio communication device configured to transmit the delay stream $S2_{delay}$ after superimposing the delay stream $S2_{delay}$ on the delay stream S2.

Although nothing is particularly mentioned about the standard of the radio communication system in the aforementioned embodiments, the aforementioned embodiments may be applied to LTE-Advanced, which is considered as the fourth generation (4G) mobile phone system. The specification of LTE-Advanced is defined in 3GPP (3rd Generation Partnership Project), which is a standardization project of the radio communication system. The cooperative MIMO technique is termed as CoMP (Coordinated Multipoint transmission/reception) in LTE-Advanced.

As described above, the present invention naturally includes various embodiments which are not described herein. Accordingly, the technical scope of the present invention should be determined only by the matters to define the invention in the scope of claims regarded as appropriate based on the description.

Note that, the entire content of Japanese Patent Application No. 2008-246037 (filed on Sep. 25, 2008) is incorporated herein by reference.

INDUSTRIAL APPLICABILITY

As described above, the radio communication system, the transmission system, the radio terminal and the radio communication method according to the present invention are advantageous in a radio communication field such as mobile communications because they are capable of sufficiently improving the signal separation performance by using a cooperative MIMO technique even in a case where the propagation channel characteristic fluctuates rapidly or where the channel estimation value includes an estimation error.

The invention claimed is:

1. A radio communication system comprising:
a transmission system including
    a first radio communication device configured to superimpose a first signal sequence and a first delay signal sequence which is generated by delaying the first signal sequence, and transmit a first superimposed signal including the first signal sequence and the first delay signal sequence,
    a second radio communication device configured to superimpose a second signal sequence and a second delay signal sequence which is generated by delaying the second signal sequence by a delay amount different from a delay amount of the first delay signal sequence, and to transmit a second superimposed signal including the second signal sequence and the second delay signal sequence using the same frequency band as the first signal sequence in the same time range as the first signal sequence, and
    a notification unit configured to notify the radio terminal of first delay information about the first delay signal sequence and second delay information about the second delay signal sequence; and
a radio terminal including
    a receiver configured to receive the first and second superimposed signal sequences from the transmission system in the same time range, and to receive the first and second delay information, and
    a separation processor configured to execute separation processing to separate the first and second signal sequences received by the receiver, wherein
    the separation processor combines the first signal sequence and the first delay signal sequence in accordance with the notified first delay information, and also combines the second signal sequence and the second delay signal sequence in accordance with the notified second delay information, when executing the separation processing.

2. The radio communication system according to claim 1, wherein
    when executing diversity transmission using the same signal sequences as the first and second signal sequences, the first radio communication device superimposes and transmits the first signal sequence and the first delay signal sequence, the first delay signal sequence having a delay amount equal to a delay amount of the second delay signal sequence, and
    when executing the diversity transmission, the second radio communication device superimposes and transmits the second signal sequence and the second delay signal sequence, the second delay signal sequence having a delay amount equal to a delay amount of the first delay signal sequence.

3. The radio communication system according to claim 1, wherein
    the separation processor includes: a first extraction unit configured to extract the first signal sequence in the separation processing; and a second extraction unit configured to extract the second signal sequence in the separation processing,
    the first extraction unit extracts the first signal sequence by using at least one of: in-phase combination by which the first signal sequence and the first delay signal sequence are combined in the same phase; and reversed-phase combination by which the second signal sequence and the second delay signal sequence are combined in reversed-phase, and
    the second extraction unit extracts the second signal sequence by using at least one of: reversed-phase combination by which the first signal sequence and the first delay signal sequence are combined in reversed-phase; and in-phase combination by which the second signal sequence and the second delay signal sequence are combined in the same phase.

4. The radio communication system according to claim 1, wherein the first delay information includes information indicating a delay amount of the first delay signal sequence, and the second delay information includes information indicating a delay amount of the second delay signal sequence.

5. The radio communication system according to claim 1, wherein the first delay signal sequence and the second delay signal sequence have different amplitudes, the first delay information includes information indicating the amplitude of the first delay signal sequence, and the second delay information includes information indicating the amplitude of the second delay signal sequence.

6. The radio communication system according to claim 1, wherein the first radio communication device and the second radio communication device are different radio base stations.

7. A transmission system comprising:
    a first radio communication device configured to superimpose a first signal sequence and a first delay signal sequence which is generated by delaying the first signal sequence, and transmit a first superimposed signal including the first signal sequence and the first delay signal sequence;
    a second radio communication device configured to superimpose a second signal sequence and a second delay signal sequence which is generated by delaying the second signal sequence by a delay amount different from a delay amount of the first delay signal sequence, and to transmit a second superimposed signal including the second signal sequence and the second delay signal sequence using the same frequency band as the first signal sequence in the same time range as the first signal sequence; and
    a notification unit configured to notify the radio terminal of first delay information about the first delay signal sequence and second delay information about the second delay signal sequence.

8. A radio terminal comprising:
    a receiver configured to receive a first signal sequence and a second signal sequence in the same time range from a transmission system including a first radio communication device transmitting the first signal sequence and a second radio communication device transmitting the second signal sequence using the same frequency band as the first signal sequence in the same time range as the first signal sequence; and
    a separation processor configured to execute separation processing to separate the first signal sequence and the second signal sequence received by the receiver,
    wherein
        the receiver receives the first signal sequence, a first delay signal sequence generated by delaying the first signal sequence, and first delay information about the first delay signal sequence, the receiver receives the second signal sequence, a second delay signal sequence generated by delaying the second signal sequence by a delay amount different from a delay amount of the first delay signal sequence, and second delay information about the second delay signal sequence, and the separation processor combines the first signal sequence and the first delay signal sequence in accordance with the first delay information, and also combines the second signal sequence and the second delay signal sequence in accordance with the second delay information, when executing the separation processing.

9. A radio communication method comprising the steps of:

by a first radio communication device, superimposing a first signal sequence and a first delay signal sequence which is generated by delaying the first signal sequence, and transmitting a first superimposed signal including the first signal sequence and the first delay signal sequence;

by a second radio communication device, superimposing a second signal sequence and a second delay signal sequence which is generated by delaying the second signal sequence by a delay amount different from that of the first delay signal sequence, and transmitting a second superimposed signal including the second signal sequence and the second delay signal sequence using the same frequency band as the first signal sequence in the same time range as the first signal sequence;

notifying a radio terminal of first delay information about the first delay signal sequence and second delay information about the second delay signal sequence by a transmission system including the first radio communication device and the second radio communication device;

by a receiver of the radio terminal, receiving the first superimposed signal and the second superimposed signal in the same time range from the transmission system, and receiving the first and second delay information;

combining the first signal sequence and the first delay signal sequence in accordance with the notified first delay information by a separation processor of the radio terminal when executing separation processing, the separation processor configured to execute the separation processing to separate the first signal sequence and the second signal sequence received by the receiver; and combining the second signal sequence and the second delay signal sequence in accordance with the notified second delay information by the separation processor of the radio terminal when executing the separation processing.

10. The radio communication system according to claim 3, wherein the in-phase combination by which the first signal sequence and the first delay sequence are combined in the same phase comprises causing the first signal sequence and the first delay sequence to coincide with each other on a time axis in accordance with the notified first delay information, and combining the first signal sequence and the first delay sequence in the same phase, and wherein the in-phase combination by which the second signal sequence and the second delay signal sequence are combined in the same phase comprises causing the second signal sequence and the second delay sequence to coincide with each other on a time axis in accordance with the notified second delay information, and combining the second signal sequence and the second delay sequence in the same phase.

11. The radio communication system according to claim 3, wherein the reversed-phase combination by which the first signal sequence and the first delay sequence are combined in reversed-phase comprises causing the first signal sequence and the first delay sequence to coincide with each other on a time axis in accordance with the notified first delay information, and combining the first signal sequence and the first delay sequence in reversed phase, and wherein the reversed-phase combination by which the second signal sequence and the second delay signal sequence are combined in reversed-phase comprises causing the second signal sequence and the second delay sequence to coincide with each other on a time axis in accordance with the notified second delay information, and combining the second signal sequence and the second delay sequence in reversed phase.

12. The radio terminal according to claim 8, wherein combining the first signal sequence and the first delay sequence in accordance with the first delay information comprises causing the first signal sequence and the first delay signal sequence to coincide with each other on a time axis in accordance with the first delay information, and combining the first signal sequence and the first delay sequence in a same phase, and wherein combining the second signal sequence and the second delay sequence in accordance with the second delay information comprises causing the second signal sequence and the second delay signal sequence to coincide with each other on a time axis in accordance with the second delay information, and combining the second signal sequence and the second delay sequence in a same phase.

13. The radio terminal according to claim 8, wherein combining the first signal sequence and the first delay sequence in accordance with the first delay information comprises causing the first signal sequence and the first delay signal sequence to coincide with each other on a time axis in accordance with the first delay information, and combining the first signal sequence and the first delay sequence in a reversed phase, and wherein combining the second signal sequence and the second delay sequence in accordance with the second delay information comprises causing the second signal sequence and the second delay signal sequence to coincide with each other on a time axis in accordance with the second delay information, and combining the second signal sequence and the second delay sequence in a reversed phase.

14. The method according to claim 9, wherein combining the first signal sequence and the first delay sequence in accordance with the notified first delay information comprises causing the first signal sequence and the first delay signal sequence to coincide with each other on a time axis in accordance with the notified first delay information, and combining the first signal sequence and the first delay sequence in a same phase, and wherein combining the second signal sequence and the second delay sequence in accordance with the notified second delay information comprises causing the second signal sequence and the second delay signal sequence to coincide with each other on a time axis in accordance with the notified second delay information, and combining the second signal sequence and the second delay sequence in a same phase.

15. The method according to claim 9, wherein combining the first signal sequence and the first delay sequence in accordance with the notified first delay information comprises causing the first signal sequence and the first delay signal sequence to coincide with each other on a time axis in accordance with the notified first delay information, and combining the first signal sequence and the first delay sequence in a reversed phase, and wherein combining the second signal sequence and the second delay sequence in accordance with the notified second delay information comprises causing the second signal sequence and the second delay signal sequence to coincide with each other on a time axis in accordance with the notified second delay information, and combining the second signal sequence and the second delay sequence in a reversed phase.

* * * * *